(12) United States Patent
Xiong

(10) Patent No.: US 9,470,898 B2
(45) Date of Patent: Oct. 18, 2016

(54) 2D-3D SWITCHING DEVICE OF NAKED EYE 3D DISPLAY

(71) Applicant: Shenzhen China Star Optoelectronics Technology Co., Ltd., Shenzhen, Guangdong (CN)

(72) Inventor: Yuan Xiong, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 88 days.

(21) Appl. No.: 14/430,207

(22) PCT Filed: Sep. 16, 2014

(86) PCT No.: PCT/CN2014/086587
§ 371 (c)(1),
(2) Date: Mar. 20, 2015

(87) PCT Pub. No.: WO2016/026188
PCT Pub. Date: Feb. 25, 2016

(65) Prior Publication Data
US 2016/0259171 A1   Sep. 8, 2016

(30) Foreign Application Priority Data
Aug. 20, 2014   (CN) .......................... 2014 1 0415861

(51) Int. Cl.
*G02B 26/00* (2006.01)
*G02B 27/22* (2006.01)
(52) U.S. Cl.
CPC ......... *G02B 27/2214* (2013.01); *G02B 26/005* (2013.01); *G02B 2207/115* (2013.01)

(58) Field of Classification Search
USPC .................................................. 359/290–296
See application file for complete search history.

(56) References Cited

U.S. PATENT DOCUMENTS

| 8,730,154 B2* | 5/2014 | Dean | G09G 3/344 345/107 |
| 2014/0126038 A1* | 5/2014 | Choi | G02B 26/005 359/290 |
| 2014/0247408 A1* | 9/2014 | Hwang | G02F 1/133526 349/16 |

* cited by examiner

*Primary Examiner* — Mohammed Hasan
(74) *Attorney, Agent, or Firm* — Andrew C. Cheng

(57) ABSTRACT

The present invention provides a 2D-3D switching device of a naked eye 3D display, comprising a first substrate (1), a second substrate (2) oppositely located to the first substrate (1), a plurality of electrodes (3) located between the first substrate (1) and the second substrate (2) and on the second substrate (2), a dielectric layer (4) formed on the second substrate (1) and completely covering surfaces of the plurality of electrodes (3) and a first fluid (51) which is hydrophobic and a second fluid (52) which is hydrophilic which fill between the first substrate (1) and the second substrate (2); the first substrate (1) comprises a prism (11), and a side of the first substrate (1) having the prism (11) is opposite to the second substrate (2), and the prism (11) of the first substrate (1) comprises a plurality of curved surface zones (111) which are evenly distributed and a plurality of perimeter zones (112) located surrounding the curved surface zones (111), and each of the electrodes (3) is positioned corresponding to one curved surface zone (111). The device can commodiously achieve the switch between 2D display state and 3D display state of the naked eye 3D display.

9 Claims, 2 Drawing Sheets

2D-3D SWITCHING DEVICE OF NAKED EYE 3D DISPLAY

FIELD OF THE INVENTION

The present invention relates to a display technology field, and more particularly to a manufacture method of a 2D-3D switching device of a naked eye 3D display.

BACKGROUND OF THE INVENTION

The 3D display technology is to utilize a series of optical means to create optical parallax for the left and right eyes of an audience. The different images are received and a 3D effect sense is formed in the audience's brain. The 3D display technology is one of the fusion engines of industrialization and informatization, in the mean time, it is also a basic and strategic tools technology which has been widely used for the industrial community and the industrial creation community. With the 3D technology ideas, some traditional businesses, such as advertisement media, exhibition, travel investment, scientific research and teaching, games and entertainment, industrial design, geologic surveying and mapping, medical diagnosis, military affairs, scene reconstruction and etc. are given with the hopes of speeding up the industry upgrade and innovation. Meanwhile, kinds of application for life, such as 3D street view, 3D video chat, 3D shopping and etc. also can be crazy popular.

The 3D display technology can be categorized into two types of the glass type and the naked eye type. For the glass type, just as the name implied, a glass involved with the present display skill has to be worn for being able to see the 3D effect. On the contrary, for the naked eye type, no assistance of the glass is demanded and the 3D effect can be seen directly.

For these two years, the naked eye 3D technology has already become the hot spot of the digital industry. As concerning the AD player, the display to the cell phone, the TV and the computer, the vendors all over the world have been announced the naked eye 3D demonstration products and the sales volume is explosive. The naked eye 3D display is to utilize the optical parallax property of human's two eyes and a display system providing living stereoscopic image with space and depth can be achievable without any accessory equipment (such as 3D glass, helmet and etc.). The naked eye stereoscopic image has already been favored by the consumers in general with its true and real representability, beautiful and elegant atmosphere infectivity, strong and shocking visual impact.

Most of the naked eye 3D display technology at present utilizes a prism to proceed light splitting. If the switching function between the 2D display state and 3D display state needs to be equipped and the prism is no longer applicable but liquid crystal lens is demanded. However, the performance of the liquid crystal lens is worse in wide angle and a gradually changing zone of the liquid crystal exists which can leads to the interference among the adjacent pixels.

SUMMARY OF THE INVENTION

An objective of the present invention is to provide a 2D-3D switching device of a naked eye 3D display capable of commodiously achieving the switch between 2D display state and 3D display state of the naked eye 3D display. The restricted view angle and the issues of interference among the adjacent pixels existing in the switching device for the liquid crystal types can be prevented.

For realizing the aforesaid objective, the present invention provides a 2D-3D switching device of a naked eye 3D display, comprising a first substrate, a second substrate oppositely located to the first substrate, a plurality of electrodes located between the first substrate and the second substrate and on the second substrate, a dielectric layer formed on the second substrate and completely covering surfaces of the plurality of electrodes, and a first fluid which is hydrophobic and a second fluid which is hydrophilic that fill between the first substrate and the second substrate; the first substrate comprises a prism, and a side of the first substrate having the prism is opposite to the second substrate, and the prism of the first substrate comprises a plurality of curved surface zones which are evenly distributed and a plurality of perimeter zones located surrounding the curved surface zones, and each of the electrodes is positioned corresponding to one curved surface zone.

The electrodes are ITO electrodes.

The dielectric layer is made of insulated transparent material which is hydrophobic.

A property of an upper surface of the dielectric layer is changed by gathering electric charges on the upper surface to change the property of the upper surface to make the upper surface of the dielectric layer to be hydrophilic.

Material of the dielectric layer is silicon nitride.

A refractive index of the first fluid is close to a refractive index of the prism of the first substrate, and a refractive index of the second fluid is distinguished from the refractive index of the prism of the first substrate.

The difference between the refractive index of the first fluid and the refractive index of the prism of the first substrate is smaller than 0.05, and the difference between the refractive index of the second fluid and the refractive index of the prism of the first substrate is larger than 0.1.

The first fluid is oil, and the second fluid is water.

The perimeter zones are located between every two adjacent curved surface zones.

An insulated projection is formed between adjacent electrodes, and one insulated projection positioned corresponding to one perimeter zone.

The benefits of the present invention are: according to the 2D-3D switching device of the naked eye 3D display, the hydrophobic first fluid and the hydrophilic second fluid are located between the two substrates. By electrifying or dis-electrifying the electrodes to change the property of the dielectric layer to be hydrophilic or hydrophobic. Employing the theory of Electrowetting, the first fluid and the second fluid are controlled to contact with the curved surface zone of the prism to form different light paths. Accordingly, the switch between 2D display state and 3D display state of the naked eye 3D display can be commodiously achieved. The restricted view angle and the issues of interference among the adjacent pixels existing in the switching device for the liquid crystal types can be prevented to improve the display quality of the naked eye 3D display.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution, as well as beneficial advantages, of the present invention will be apparent from the following detailed description of an embodiment of the present invention, with reference to the attached drawings.

In drawings.

DETAILED DESCRIPTION OF PREFERRED EMBODIMENTS

Embodiments of the present invention are described in detail with the technical matters, structural features, achieved objects, and effects with reference to the accompanying drawings as follows.

The present invention provides a 2D-3D switching device of the naked eye 3D display. By employing the theory of Electrowetting to achieve the switch between the between 2D display state and 3D display state. The Electrowetting is a kind of microfluidics phenomenon. The theory is to apply external voltages between the solid electrodes and the fluids to change the contact angles of the fluids, and accordingly to change the contact area of the fluids for realizing the objective of changing light paths.

Figure 1:
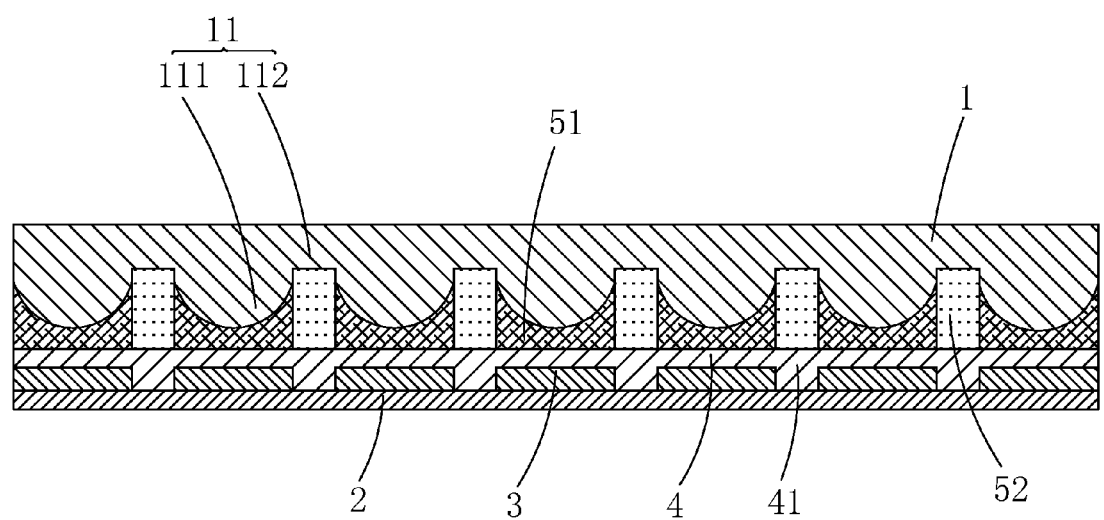
FIG. 1 is a sectional structure diagram of a 2D-3D switching device of a naked eye 3D display according to the present invention in 2D display state.
Figure 2:
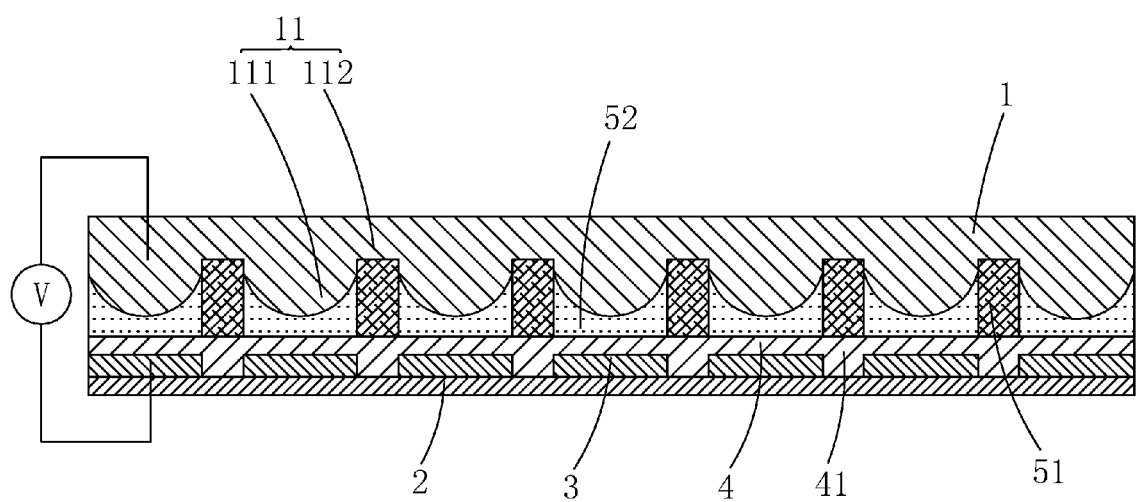
FIG. 2 is a sectional structure diagram of a 2D-3D switching device of a naked eye 3D display according to the present invention in 3D display state.

Please refer to FIG. 1 and FIG. 2 at the same time. A 2D-3D switching device of a naked eye 3D display according to the present invention comprises a first substrate 1, a second substrate 2 oppositely located to the first substrate 1, a plurality of electrodes 3 located between the first substrate 1 and the second substrate 2 and on the second substrate 2, a dielectric layer 4 formed on the second substrate 2 and completely covering surfaces of the plurality of electrodes 3, and a first fluid 51 which is hydrophobic and a second fluid 52 which is hydrophilic that fill between the first substrate 1 and the second substrate 2; the first substrate 1 comprises a prism 11, and a side of the first substrate 1 having the prism 11 is opposite to the second substrate 2.

The prism 11 of the first substrate 1 comprises a plurality of curved surface zones 111 which are evenly distributed and a plurality of perimeter zones 112 located surrounding the curved surface zones 111, wherein the perimeter zones 112 are located between every two adjacent curved surface zones 111, and each of the electrodes 3 is positioned corresponding to one curved surface zone 111.

An insulated projection 41 is formed between adjacent electrodes because the dielectric layer 4 completely covers the surfaces of the plurality of electrodes 3. One insulated projection 41 is positioned corresponding to one perimeter zone 112 of the prism 11 of the first substrate 1.

Preferably, the electrodes 3 are ITO electrodes.

The dielectric layer 4 is made of insulated transparent material which is hydrophobic, and a property of an upper surface of the dielectric layer 4 can be changed by gathering electric charges on the upper surface to change the property of the upper surface to make the upper surface of the dielectric layer 4 to be hydrophilic.

Preferably, the material of the dielectric layer 4 is silicon nitride.

A refractive index of the first fluid 51 is to a refractive index of the prism 11 of the first substrate 1, and the difference between the two is smaller than 0.05. Preferably, the first fluid 51 is oil.

A refractive index of the second fluid 52 is distinguished from the refractive index of the prism 11 of the first substrate 1, and the difference between the two is larger than 0.1. Preferably, the second fluid 52 is water.

Please refer to FIG. 1, which is under circumstance that the electrodes 3 are diselectrified. The 2D-3D switching device of the naked eye 3D display according to the present invention functions in 2D display state. Because the plurality of electrodes 3 are not electrified, the dielectric layer 4 shows to be hydrophobic, that is the property of itself. Because the contact angles of the hydrophilic second fluid 52 and the dielectric layer 4 are larger and the contact area is smaller, the second fluid 52 gathers at the perimeter zones 112 of the prism 11 opposite to the insulated projections 41; because the first fluid 51 is hydrophobic, the contact area thereof with the dielectric layer 4 is larger, and therefore, the first fluid 51 gathers at the curved surface zones 111 of the prism 11.

Because the refractive indexes of the first fluid 51 and the curved surface zones 111 of the prism 11 are close, and the first fluid 51 gathers at the curved surface zones 111, the refraction effect is weakened. At this moment, the 2D-3D switching device of the naked eye 3D display will not change the propagating direction of the light transmitting through the device. That is, the naked eye 3D display is in 2D display state.

Please refer to FIG. 2, which is under circumstance that the electrodes 3 are electrified. The 2D-3D switching device of the naked eye 3D display according to the present invention functions in 3D display state. By applying voltage to the plurality of electrodes 3, the electric charges are gathered on the upper surface of the dielectric layer 4 and accordingly, the property of the upper surface is changed to make the upper surface of the dielectric layer 4 to be hydrophobic. Because the second fluid 52 is hydrophilic and the contact area of the second fluid 52 and the dielectric layer 4 is larger, the second fluid 52 gathers at the curved surface zones 111 of the prism 11. The contact angle of the hydrophobic first fluid 51 and the dielectric layer 4 is larger and the contact area is smaller. Accordingly, the first fluid 51 is forced to gather at the perimeter zones 112 of the prism 11, which is right opposite to the insulated projections 41.

Because the difference between the refractive index of the second fluid 52 and the refractive index of the prism 11 is larger, and the second fluid 52 gathers at the curved surface zones 111, therefore, the light penetrating through the prism 11 is refracted to achieve the light splitting function required for the 3D display mode. Thus, the naked eye 3D display can accomplish the switch from the 2D display state to the 3D display state.

When the naked eye 3D display is requested to switch from the 3D display state to the 2D display state again, it can be realized only by diselectrifying the electrodes 3, i.e. cancelling the applied voltage to the electrodes 3. At this moment, the upper surface of the dielectric layer 4 is no longer gathered with the electric charges and resumes being originally hydrophobic. The hydrophobic first fluid 51 re-gathers at the curved surface zones 111 of the prism 11 and the hydrophilic second fluid 52 is forced to gather at the perimeter zones 112 of the prism 11 which is right opposite to the insulated projections 41. The refraction effect is weakened to accomplish the switch from the from the 3D display state to the 2D display state.

In conclusion, according to the 2D-3D switching device of the naked eye 3D display of the present invention, the hydrophobic first fluid and the hydrophilic second fluid are located between the two substrates. By electrifying or diselectrifying the electrodes to change the property of the dielectric layer to be hydrophilic or hydrophobic. Employing the theory of Electrowetting, the first fluid and the second fluid are controlled to contact with the curved surface zone of the prism to form different light paths. Accordingly, the switch between 2D display state and 3D display state of the naked eye 3D display can be commodiously achieved. The restricted view angle and the issues of interference among the adjacent pixels existing in the switching device for the liquid crystal types can be prevented to improve the display quality of the naked eye 3D display.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A 2D-3D switching device of a naked eye 3D display, comprising a first substrate, a second substrate oppositely located to the first substrate, a plurality of electrodes located between the first substrate and the second substrate and on the second substrate, a dielectric layer formed on the second substrate and completely covering surfaces of the plurality of electrodes, and a first fluid which is hydrophobic and a second fluid which is hydrophilic that fill between the first substrate and the second substrate; the first substrate comprises a prism, and a side of the first substrate having the prism is opposite to the second substrate, and the prism of the first substrate comprises a plurality of curved surface zones which are evenly distributed and a plurality of perimeter zones located surrounding the curved surface zones, and each of the electrodes is positioned corresponding to one curved surface zone;

wherein a refractive index of the first fluid is close to a refractive index of the prism of the first substrate, and a refractive index of the second fluid is distinguished from the refractive index of the prism of the first substrate; and wherein the difference between the refractive index of the first fluid and the refractive index of the prism of the first substrate is smaller than 0.05, and the difference between the refractive index of the second fluid and the refractive index of the prism of the first substrate is larger than 0.1.

2. The 2D-3D switching device of the naked eye 3D display according to claim 1, wherein the electrodes are ITO electrodes.

3. The 2D-3D switching device of the naked eye 3D display according to claim 1, wherein the dielectric layer is made of insulated transparent material which is hydrophobic.

4. The 2D-3D switching device of the naked eye 3D display according to claim 3, wherein a property of an upper surface of the dielectric layer is changed by gathering electric charges on the upper surface to change the property of the upper surface to make the upper surface of the dielectric layer to be hydrophilic.

5. The 2D-3D switching device of the naked eye 3D display according to claim 4, wherein material of the dielectric layer is silicon nitride.

6. The 2D-3D switching device of the naked eye 3D display according to claim 1, wherein the first fluid is oil, and the second fluid is water.

7. The 2D-3D switching device of the naked eye 3D display according to claim 1, wherein the perimeter zones are located between every two adjacent curved surface zones.

8. The 2D-3D switching device of the naked eye 3D display according to claim 1, wherein an insulated projection is formed between adjacent electrodes, and one insulated projection positioned corresponding to one perimeter zone.

9. A 2D-3D switching device of a naked eye 3D display, comprising a first substrate, a second substrate oppositely located to the first substrate, a plurality of electrodes located between the first substrate and the second substrate and on the second substrate, a dielectric layer formed on the second substrate and completely covering surfaces of the plurality of electrodes and a first fluid which is hydrophobic and a second fluid which is hydrophilic that fill between the first substrate and the second substrate; the first substrate comprises a prism, and a side of the first substrate having the prism is opposite to the second substrate, and the prism of the first substrate comprises a plurality of curved surface zones which are evenly distributed and a plurality of perimeter zones located surrounding the curved surface zones, and each of the electrodes is positioned corresponding to one curved surface zone;

wherein the electrodes are ITO electrodes;

wherein the dielectric layer is made of insulated transparent material which is hydrophobic;

wherein a property of an upper surface of the dielectric layer is changed by gathering electric charges on the upper surface to change the property of the upper surface to make the upper surface of the dielectric layer to be hydrophilic;

wherein material of the dielectric layer is silicon nitride;

wherein a refractive index of the first fluid is close to a refractive index of the prism of the first substrate, and a refractive index of the second fluid is distinguished from the refractive index of the prism of the first substrate;

wherein the difference between the refractive index of the first fluid and the refractive index of the prism of the first substrate is smaller than 0.05, and the difference between the refractive index of the second fluid and the refractive index of the prism of the first substrate is larger than 0.1;

wherein the first fluid is oil, and the second fluid is water;

wherein the perimeter zones are located between every two adjacent curved surface zones;

wherein an insulated projection is formed between adjacent electrodes, and one insulated projection positioned corresponding to one perimeter zone.

* * * * *